United States Patent
Schafer et al.

(10) Patent No.: US 6,786,234 B2
(45) Date of Patent: Sep. 7, 2004

(54) DRAINAGE TILE FLOW REGULATOR

(75) Inventors: Charlie J. Schafer, Panora, IA (US);
Leo E. Beebout, Ankeny, IA (US);
William Littler IV, Adair, IA (US)

(73) Assignee: Agri Drain Corporation, Adair, IA (US)

( * ) Notice: Subject to any disclaimer, the term of this patent is extended or adjusted under 35 U.S.C. 154(b) by 0 days.

(21) Appl. No.: 10/758,507

(22) Filed: Jan. 16, 2004

(65) Prior Publication Data

US 2004/0144432 A1 Jul. 29, 2004

Related U.S. Application Data

(63) Continuation-in-part of application No. 10/164,674, filed on Jun. 6, 2002, now Pat. No. 6,715,508.

(51) Int. Cl.$^7$ .............................. F16K 31/48; F16K 3/00
(52) U.S. Cl. .............................. 137/624.18; 137/624.11; 251/129.04; 251/326
(58) Field of Search ....................... 137/624.18, 624.11; 251/326, 329, 129.04; 239/69, 70

(56) References Cited

U.S. PATENT DOCUMENTS

| | | | | |
|---|---|---|---|---|
| 3,747,620 A | * | 7/1973 | Kah, Jr. ................. | 137/624.18 |
| 4,756,327 A | * | 7/1988 | Krause ..................... | 137/14 |
| 5,908,045 A | * | 6/1999 | Wallace et al. ............ | 137/78.3 |
| 5,938,175 A | * | 8/1999 | Young et al. .............. | 251/329 |
| 6,145,755 A | * | 11/2000 | Feltz ..................... | 137/624.11 |
| 6,484,800 B2 | * | 11/2002 | Carmody et al. ...... | 137/624.18 |
| 6,715,508 B2 | * | 4/2004 | Schafer et al. ......... | 137/624.18 |
| 6,719,272 B1 | * | 4/2004 | Iwata ..................... | 251/326 |

* cited by examiner

Primary Examiner—Kevin Lee
(74) Attorney, Agent, or Firm—G. Brian Pingel; Camille L. Urban

(57) ABSTRACT

The title flow regulator disclosed is used for regulating the level of water in the fields of an agricultural operation according to seasonal needs by a mechanism for adjusting the outflow of water from the tile line. The regulator includes a housing through which water from the tile line is directed and in which a partition with at least one aperture is positioned. At lease one vertically movable gate is associated each aperture and with a motor, an electric cylinder, and at least one actuator bar such that, upon actuation of the motor, the gate moves either open or close the aperture. If two apertures are included, the regulator can be fully open (both apertures open), fully closed (both apertures closed), or partially open (bottom aperture open, top one closed) to achieve the desired moisture level. Dates on which the gates will be moved can be pre-selected by remote signaling.

20 Claims, 6 Drawing Sheets

DRAINAGE TILE FLOW REGULATOR

This is a continuation-in-part of application Ser. No. 10/164,674 filed Jun. 6, 2002, now U.S. Pat. No. 6,715,508 for Drainage Tile Flow Regulator.

BACKGROUND OF THE INVENTION

1. Field of the Invention

The present invention relates in general to regulating the level of water in the fields of an agricultural operation and, more particularly, to a system wherein the level of moisture in the soil above a buried tile line is regulated according to seasonal needs by a pre-set calendar and mechanism for regulating the outflow of water from the tile line.

2. Description of the Prior Art

It is known in the art to use a variety of machines and apparatuses to increase or decrease moisture in soil used for agrarian purposes. Some of these machines include the use of aquifers, irrigation ditches and canals, use of overhead sprinkler irrigation, terracing for directing the flow of water while maintaining top soil and some moisture in the soil on a hill, and the laying of underground tile lines into which water will drain and flow away from the field.

Tile lines, while effectively routing excess water from the soil have heretofore typically served that single purpose. Unfortunately, when moisture levels and the season result in a need for more water in the soil, the tile lines typically continue to drain without means to control or adjust the flow. In this manner, efficient water removal by tile lines can be detrimental to the crop either by depriving the plants of moisture or by allowing nitrates and other nutrients used by plants to flow out of the soil before use by plants or before sufficient time has passed to allow them to break down naturally.

The present invention takes the old art of using tile lines to drain excess water away from soil and provides for use of those tile lines in such a way as to manage the moisture level in the soil. The management is based on seasonal needs and is provided via automatic adjustments actuated according to a twelve month calendar.

It is therefore one object of the invention to keep moisture levels appropriate for root needs by raising or lowering the water table in the soil profile through the use of tile lines;

It is another object of the invention to provide a way to keep the water table high in the soil over the winter months so that nutrients and nitrates will not be lost but can break down naturally in the soil or be maintained until needed in the spring;

It is also an object of the invention to allow the water table to be dropped as low as possible prior to harvest to allow access to the field and to minimize compaction of the soil by large equipment and also prior to planting to allow the soil to warm and encourage deep root growth and, again, to allow access to the field.

It is a further objective to provide a mechanism for achieving these objectives which can be actuated by passive power sources such as wind or solar.

SUMMARY

The tile line flow regulator of the present invention is typically installed near the outflow or end of a tile line or in a main collector line and is generally operable in one of two or three positions; partially open, fully open, or fully closed.

One embodiment includes means for pre-setting the date at which the position will be changed, means to pre-select the desired position for that date, and a mechanism which comprises a gear system, at least one lever associated with at least one gate, a motor, a power source, and a partition with at least one opening positioned inside a housing. The location of the gate or gates relative to the opening(s) in the partition dictates the flow of water through the tile which, in turn, dictates the level of moisture in the subsoil above the tile line.

The preferred embodiment comprises all of the above listed elements except rather than the use of a gear system associated with a motor and lever or levers, electric cylinders are attached to a set of actuator bars, each bar being further associated with a gate for movement thereof. As above, the location of the gate or gates relative to the opening(s) in the partition dictates the flow of water through the tile.

When used in a main collector line, more than one tile flow regulator is installed in spaced apart fashion along the line such that, in combination with the fall of the tile line, the water table can be managed relative to the fall.

One of the advantages of the present invention is that it provides for better, more efficient soil moisture management;

Another advantage is that the present invention provides more than either "open" or "closed" tile lines so the water level can be more responsive to seasonal needs;

Another advantage provided by the invention is that it provides a virtually hands-free operation triggered by date on a year round basis rather than relying on expensive water or moisture sensors or which can be actuated at will by the user;

Another advantage provided by the invention is that it provides a device which is versatile in that it can be tailored to effect different water table levels;

The present invention also provides the advantage of a single, mechanically simple arrangement to provide three possible positions for controlling water flow.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
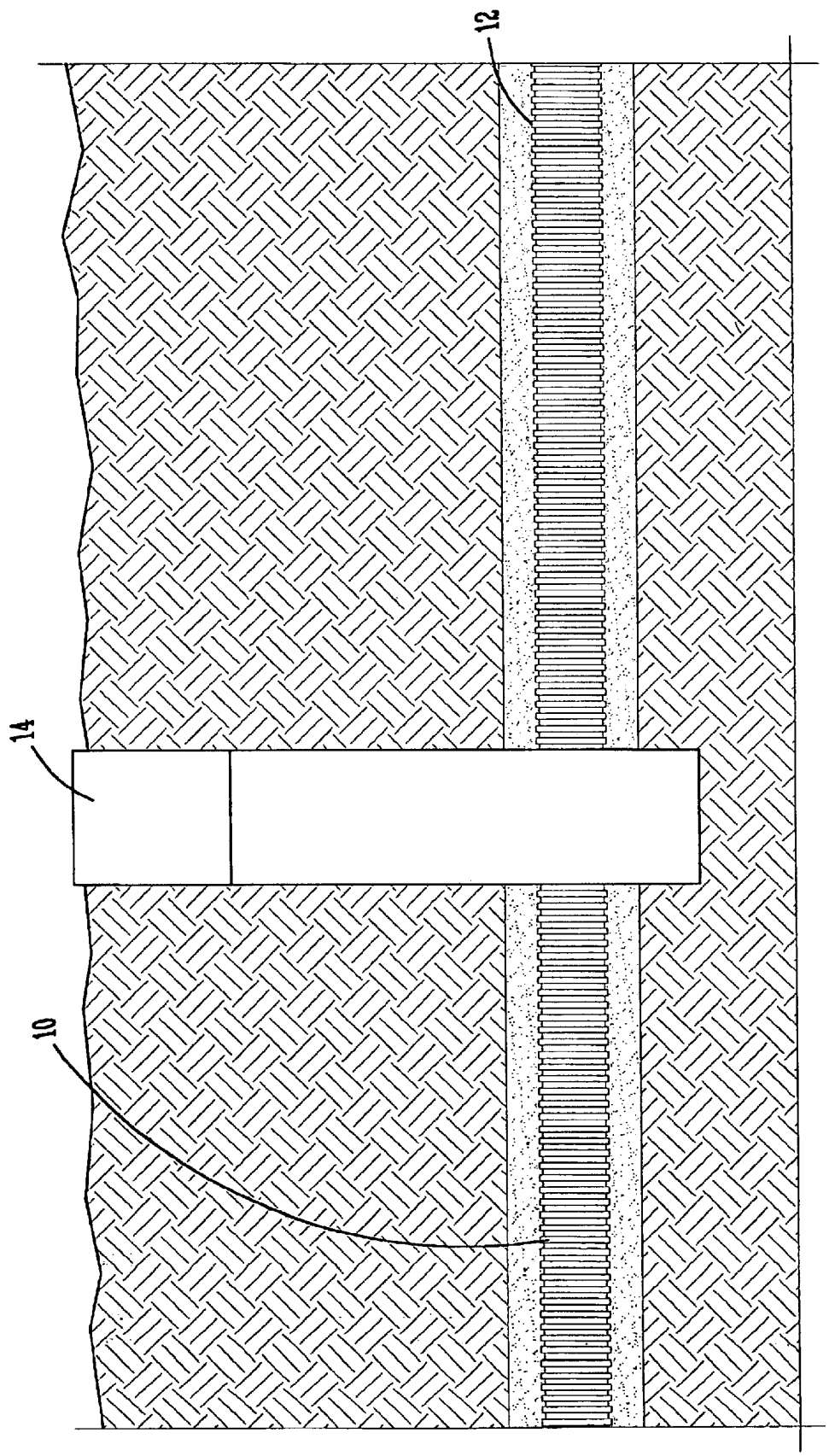
FIG. 1 is a cross section view of soil in a field showing a buried tile line, its outlet, and a preferred embodiment of the tile line flow regulator of the present invention.
Figure 2:
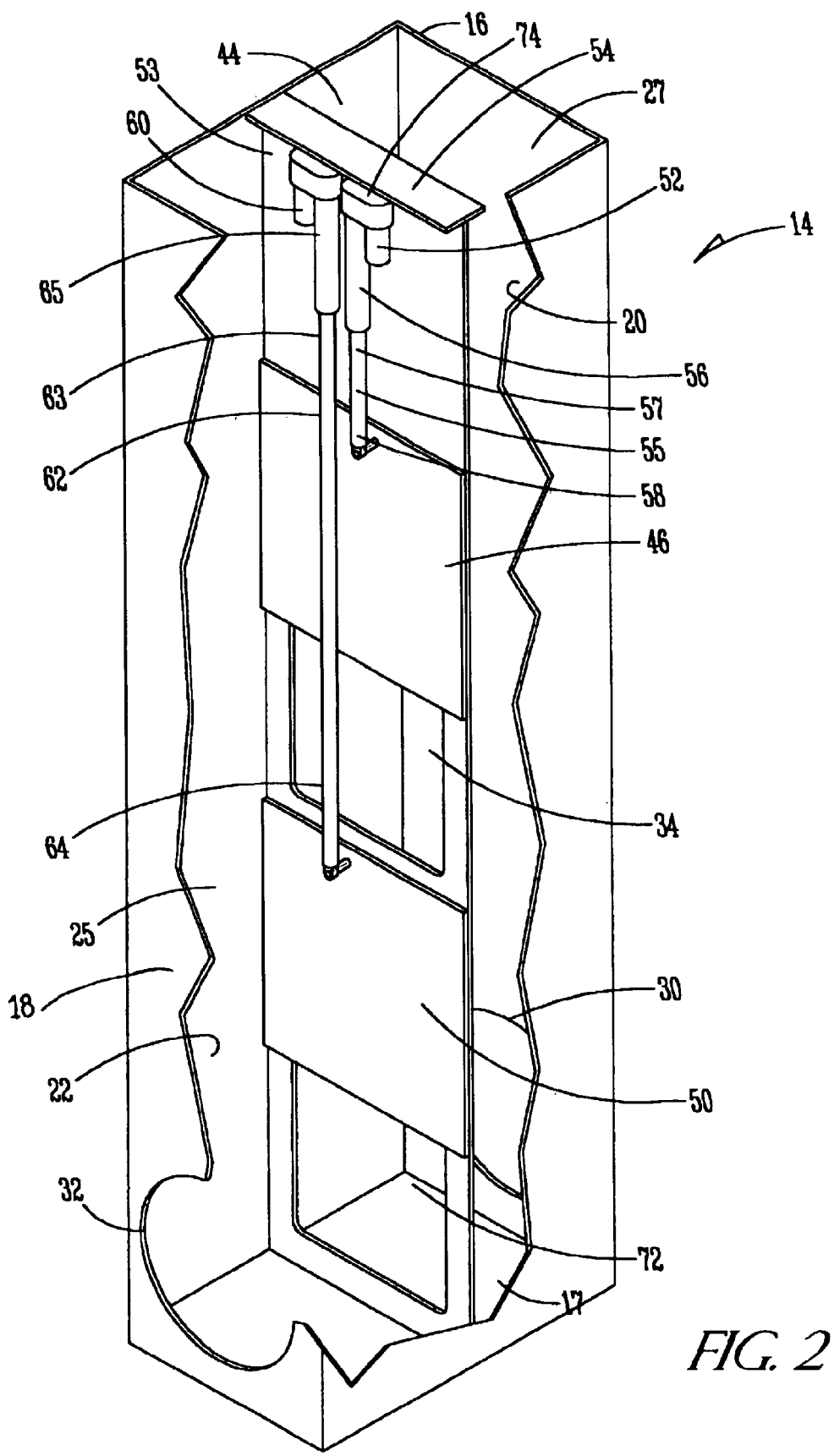
FIG. 2 is a perspective view of the present invention of FIG. 1.

As shown generally in FIG. 1, a tile line 10 is buried under soil in a field, with a general slope toward an outlet 12 and including a tile line flow regulator shown at 14. The flow regulator 14 (as shown in FIG. 2) comprises a housing 16. In one embodiment the housing 16 comprises a bottom 17, a front panel 18, a back panel 20, and two side panels 22. However, the housing 16 can be of any shape such as cylindrical as long as a bottom 17 is present.

A partition 24 divides said housing 16 into a front portion 25 and a back portion 27. Two opposed and aligned openings, 30 and 32, are provided near the bottom 17 of said housing 16. Said partition 24 comprises at least one aperture 34 not necessarily aligned with said outlet 12. The invention further comprises means for securing said partition 35 in position between said front portion 25 and said back portion 27. Preferably, means for securing said partition 35 is in the form of tracks mounted in said housing 16.

In the preferred embodiment, means for preselecting dates 40, a power source 42, a flow adjustment assembly 44, and a first vertically movable gate 46 are also enclosed in said housing 16. In the preferred embodiment, a second vertically movable gate 50 is also enclosed in said housing 16. The gates 46 and 50 are each provided with means 51 for slidably associating said gate 46 or 50 with said partition 24. Preferably, means 51 for slidably associating said gate 46 or 50 is in the form of "C" channels mounted on said partition 24.

Figure 3:
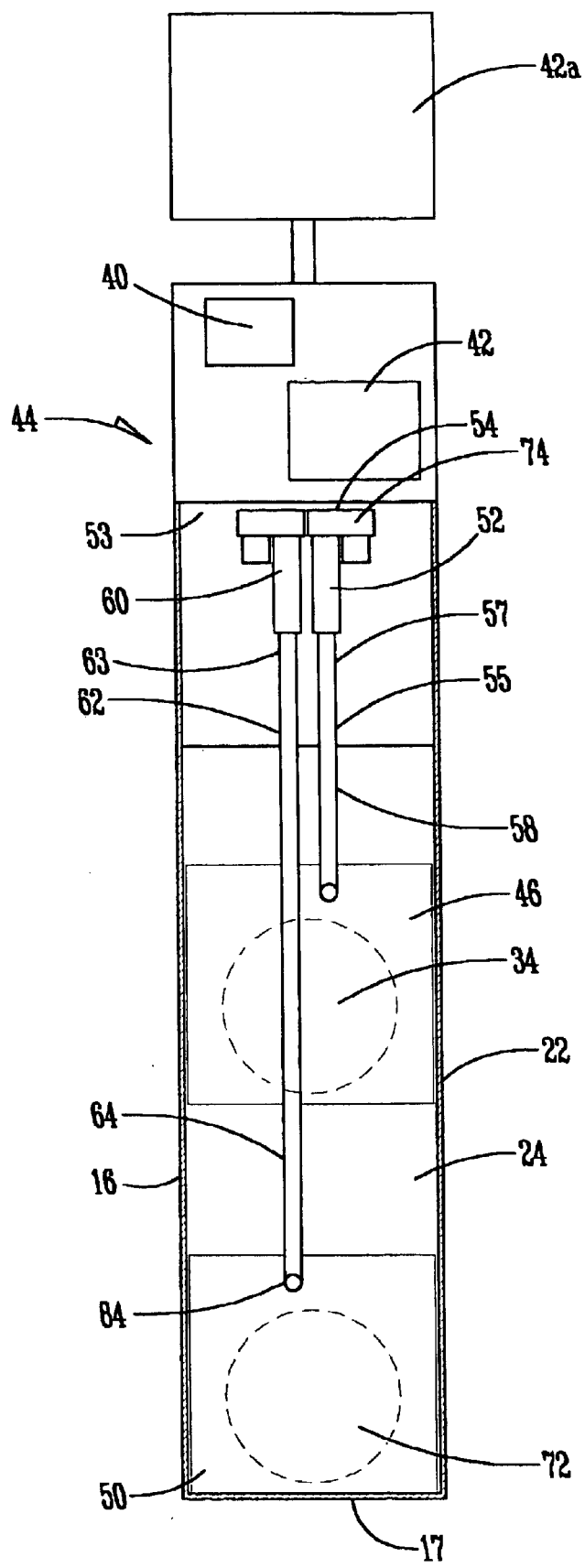
FIG. 3 is a front view of the present invention of FIG. 1, in a closed position, with a portion of the housing removed.
Figure 4:
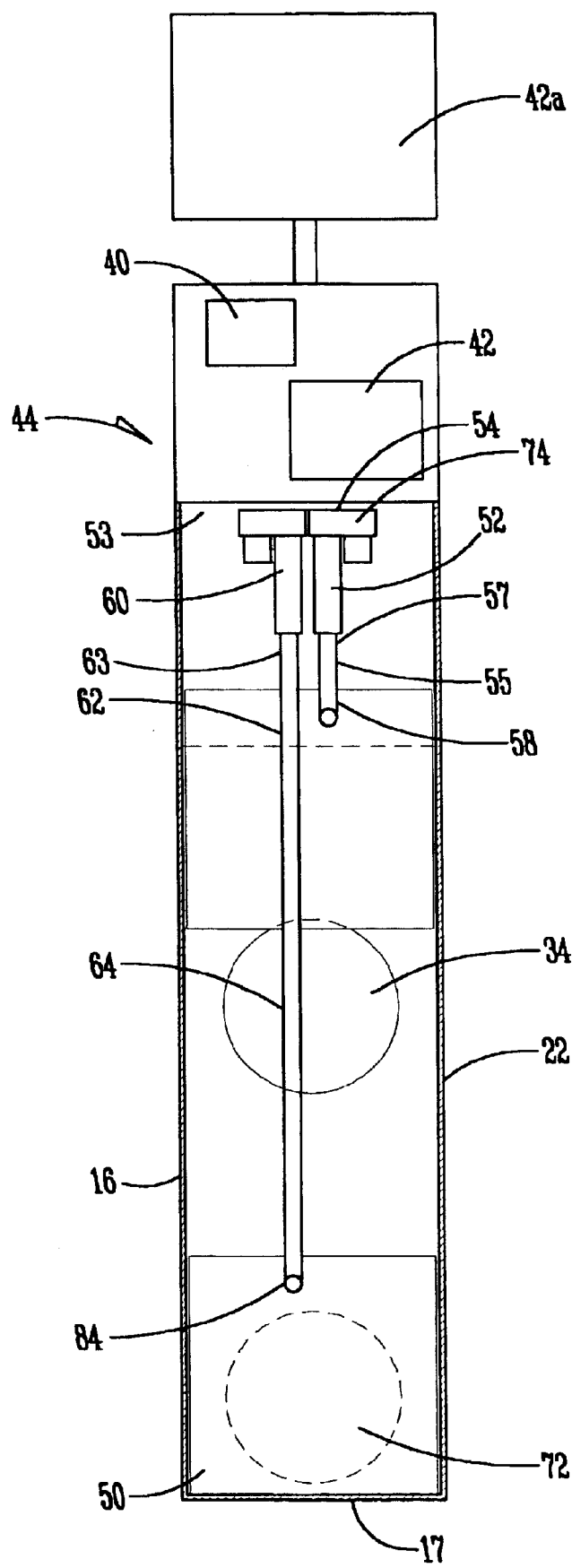
FIG. 4 is a front view of the present invention of FIG. 1 in a partially open position, with a portion of the housing removed.
Figure 5:
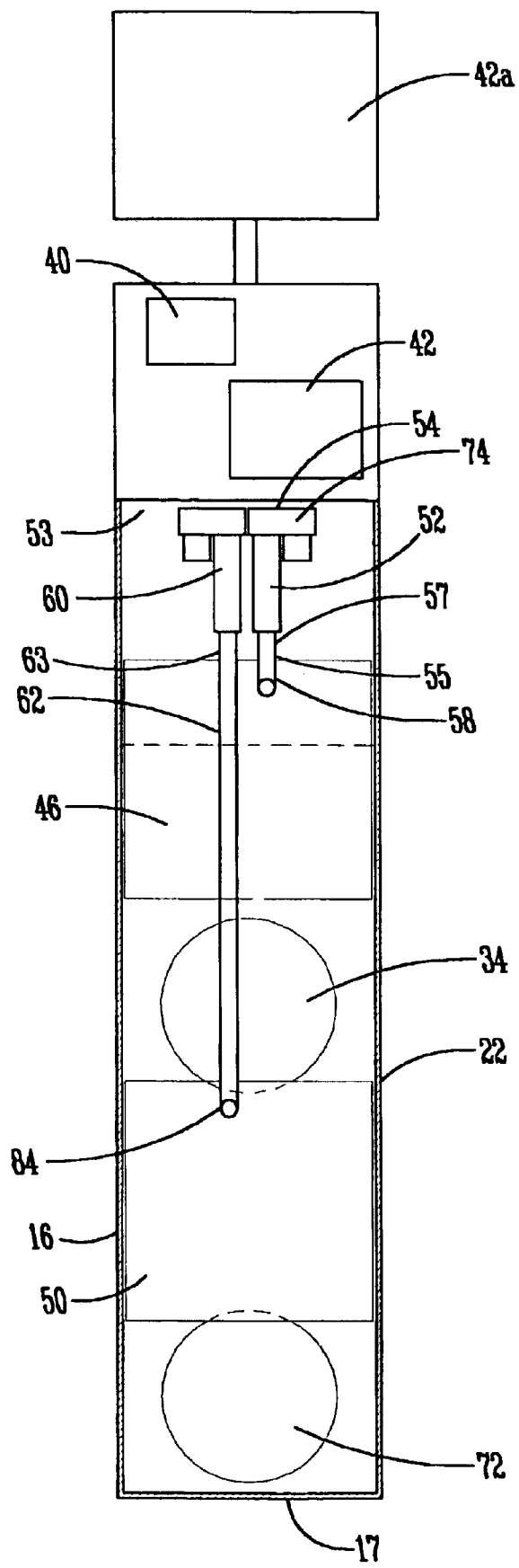
FIG. 5 is a front view of the present invention of FIG. 1 in a fully open position, with a portion of the housing removed.

FIGS. 3, 4, and 5 show said adjustment assembly 44 with a portion of the housing 16 removed. The adjustment assembly 44 comprises a power source such as a solar panel 42a and a solar charged battery which is well known in the art (not shown) and at least one electric cylinder 52 associated with an actuator bar assembly 53. Said actuator bar assembly 53 comprises a cross support 54, a first bar 55, and a first outer'sleeve 56. Said first bar 55 has an upper end 57 and a lower end 58 and is in telescopic relationship with said first outer sleeve 56. The lower end 58 of said first bar 55 is associated with said first vertically movable gate 46.

Said first vertically movable gate 46 in closed position is aligned with said at least one aperture 34 in said partition 24. Upon actuation of the electric cylinder 52 the first bar 55 is displaced vertically within said first outer sleeve 56 and said first vertically movable gate 46 is displaced accordingly, effectively opening said first aperture 34. When only one gate is contemplated, the position when said first gate is raised would be the "fully open" position and would allow flow of water through the tile line 10 at a level approximately the same as the outlet 12. The position when said first gate is lowered would be "fully closed" and the water level would have to rise above the partition 24. In the "fully closed" position, the flow regulator 14 is designed to establish the water level in the soil at its highest.

In the preferred embodiment, the flow regulator 14 includes the second gate 50 and a second aperture72 formed in said partition 24 spaced apart from and below the aperture 34. In this arrangement, the actuator bar assembly 53 further comprises an additional electric cylinder 60 associated with said actuator bar assembly, a second bar 62 comprising an upper end 63 and a lower end 64 and a second outer sleeve 65. Said second outer sleeve is in telescopic relationship with said second bar 62. The lower end 64 of said second bar 62 is associated with a second vertically movable gate 50. Said second gate 50 is aligned with the second aperture 72 in said partition. Preferably, the second aperture 72 is vertically spaced below the aperture 34 so as to be positioned near the bottom of the partition 24. Attachment means 74 associate said first outer sleeve 56 and said second outer sleeve 65 with said cross support 54. Connection means are provided between each said electric cylinder and the upper end of one of said first or second bar.

The flow regulator 14 of the preferred embodiment has at least three flow positions, "fully closed", "partially open", and "fully open". These positions are best shown in FIGS. 3–5. When both the gates 46 and 50 are aligned with their respective apertures 34 and 72 the flow regulator 14 is said to be in a "fully closed" position (See FIG. 3). Said "fully closed" position means the water level is adjusted to its highest level which is equal to the position of the partition 24 and water flows over the partition and through said opening 30 in said front panel 18.

When an electric cylinder of the adjustment assembly is actuated it moves at least one gate from the open to the closed position or from the closed to the open position. Upon activation of the flow adjustment assembly 14 described above, said at least one electric cylinder 52 moves said first bar 55 upward and telescopically within said first outer sleeve 56 raising said first gate 46. Therefore, the flow regulator 14 is "partially open" with said first gate 46 open and said second gate 70 closed and the regulator 14 operates to lower the level of the flow of water relative to the "fully closed position" (See FIG. 4).

Upon further activation of the adjustment assembly 44 said second electric cylinder 60 moves said second gate 50 through a vertical distance (see FIG. 5). When both the gates 46 and 50 are open, the flow regulator 14 is said to be "fully open" and the level of water relative to the "partially open" position is lowered thereby lowering the level of moisture in the soil.

When the second electric cylinder 60 is actuated again, it lowers the second gate 50. When the electric cylinder 52 associated with said first bar 55 and said first gate 46 is actuated again, it lowers the first bar 55 telescopically through the first outer sleeve 56 and lowers the first gate 46 returning the system to "fully closed".

In another embodiment, said partition 24 is divided into an upper portion and a lower portion. The lower portion contains aperture 72 and the upper portion contains aperture 34. In this embodiment, the spaced apart relationship of apertures 72 and 34 can be adjusted by inserting a plurality of spacers between said upper portion and the lower portion of said partition 24. Said upper portion and the lower portion between said front portion 25 and said back portion 27 of the housing 16 and the spacers are secured by tracks. In this manner the height of partition 24 can also be adjusted as can the spaced apart relationship of the apertures 72 and 34.

Said means for pre-selecting dates 40 may be set for a predetermined time and are associated with the power source 42 for the electric cylinders 52. In one embodiment, said means for pre-selecting dates 40 comprises an electronic 12-month calendar 104 and a set of dates is typically pre-selected to reflect seasonal needs. These seasonal needs will vary by crop and geography but such needs can easily be accommodated by the use of multiple predetermined dates. For example, in winter (for some crops) the invention is left in the "fully closed" position to keep valuable chemical applications from being washed away too soon. In the spring, for example on March 1, the power source 42 is actuated and said at least one electric cylinder 52 moves said first bar 55 to open the first gate 46 and leave the second 50 closed in the "partially closed" position. And so on.

Figure 6:
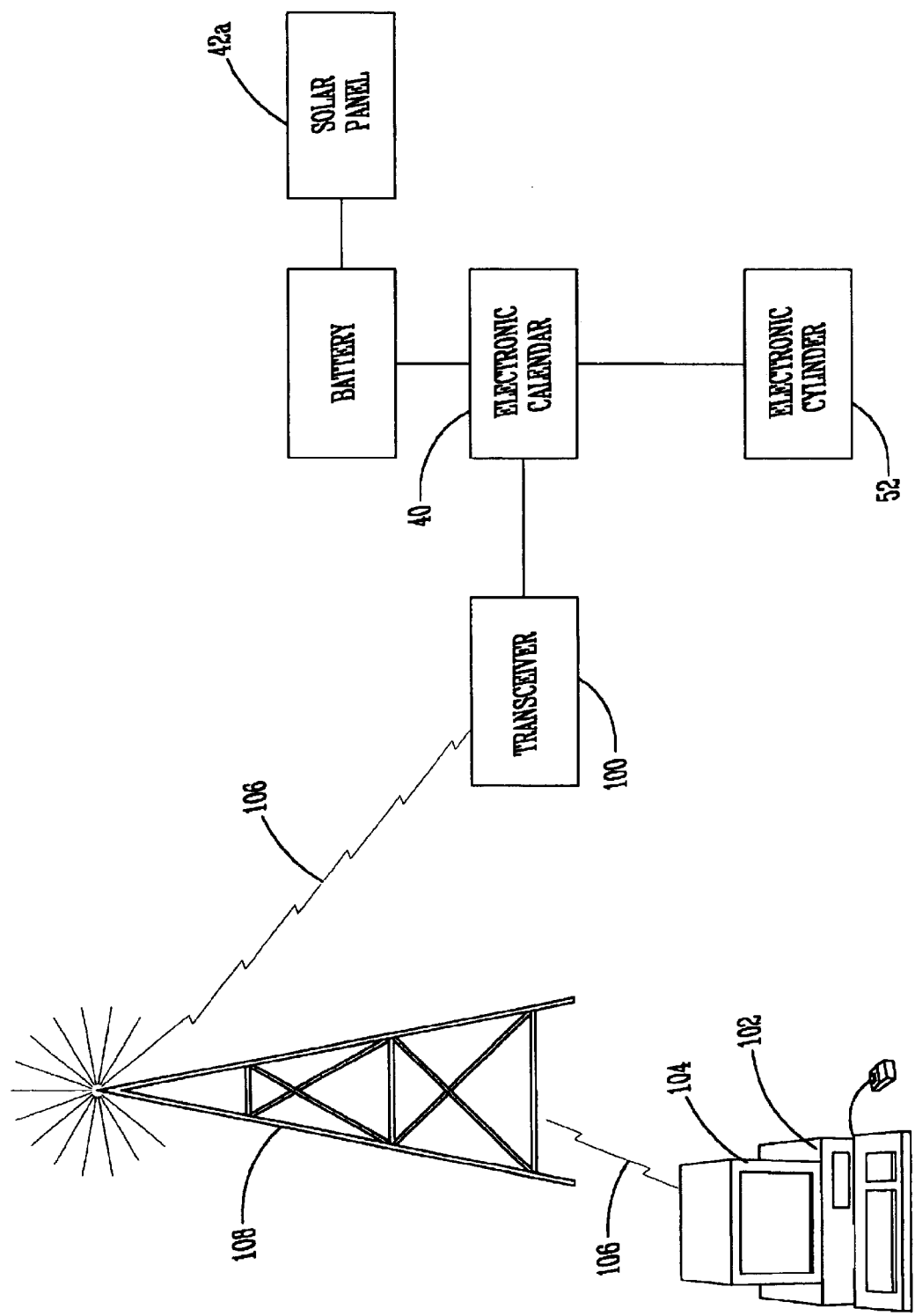
FIG. 6 is a schematic of the preferred embodiment's remote signaling of pre-selected dates.

In the preferred embodiment as shown in FIG. 6, said means for pre-selecting dates 40 comprises at least one transceiver 100 associated with a calendaring program 102 loaded in a computing means 104 many of which are known in the art and means for pre-selecting dates 40 wherein predetermined dates can be set or changed remotely. Said means for pre selecting dates 40 may comprise an electronic 12-month timer. In this embodiment, predetermined dates are input in said software and transmitted by a signal 106 through means for relaying said signal to said transceiver 108. An example of this arrangement would include a computer loaded with said software and associated with a local area network which, in turn, has the ability to send signals by wireless communication to a tower. The tower then relays the signal to the transceiver. The means for relaying said signal 106 in the preferred embodiment comprises a tower, however, it is conceivable that satellite and other possible relays could also be effectively employed. The transceiver 108 then sends the information to said means for pre-selecting dates 40 which, in turn, activates the power source 42 and the appropriate electric cylinder 52 on the pre-selected dates.

Although any kind of long lasting battery may be used to provide a power source, the preferred embodiment employs a solar panel 42a which transfers power to a solar battery which stores the charge to be used by said means for pre-selecting dates 40 and the at least one electric cylinder 52. Finally, as an added and useful feature, the preferred embodiment may include a flag which is positioned by movement of the gear assembly in such a way that a farmer can simply view the flag from a distance to confirm that the invention is working properly.

Thus, the present invention has been described in an illustrative manner. It is to be understood that the terminology that has been used is intended to be in the nature of words of description rather than of limitation.

Many modifications and variations of the present invention are possible in light of the above teachings. For example, said partition could be bolted or welded in between said back panel and said front panel of said housing. Therefore, within the scope of the appended claims, the present invention may be practiced otherwise than as specifically described.

We claim:

1. A drainage tile line flow regulator comprising:
    (a) a housing having a bottom and two opposed and aligned openings to allow water to enter and exit said housing;
    (b) a flow adjustment assembly;
    (c) said flow adjustment assembly further comprising at least one electric cylinder associated with said housing, a power source, and an actuator bar assembly;
    (d) means for pre-selecting dates associated with said power source;
    (e) a partition dividing said housing into a front portion and a back portion and having at least one aperture to permit water to flow from the housing front portion to said back portion and means for securing said partition in position between said front portion and said back portion; and
    (f) said actuator bar assembly comprising a cross support, a first bar including an upper end associated with said electric cylinder and a lower end, and a first vertically movable gate associated with said lower end of said first bar, and means for slidably associating said gate with said partition such that upon the actuation of said electric cylinder by said power source, said first gate moves relative to said at least one aperture in said partition such that said at least one aperture can be opened or closed.

2. A drainage tile flow regulator as claimed in claim 1 wherein said flow adjustment assembly further comprises an outer sleeve in telescopic relationship with said upper end of said first bar; said electric cylinder and said outer sleeve are associated with said cross bar; and said electric cylinder is further associated with said upper end of said first bar.

3. A drainage tile flow regulator as claimed in claim 1 further comprising:
    a) a second aperture in said partition vertically spaced apart from said at least one aperture;
    b) a second bar with an upper end and a lower end and associated with said at least one electric cylinder; and
    c) a second vertically movable gate associated with said second bar and means for slidably associating said second gate with said partition such that upon the actuation of said electric cylinder, said second gate moves relative to said second aperture in said partition such that said second aperture can be opened or closed.

4. A drainage tile flow regulator as claimed in claim 3 wherein said adjustment assembly further comprises a first outer sleeve in telescopic relationship with said upper end of said first bar and a second outer sleeve in telescopic relationship with said upper end of said second bar, and said electric cylinder and each said outer sleeve are associated with said cross bar, said electric cylinder is further associated with said upper end of said first bar and said upper end of said second bar.

5. A drainage tile flow regulator as claimed in claim 3 wherein said adjustment assembly further comprises:
    a) a first outer sleeve in telescopic relationship with said upper end of said first bar and a second outer sleeve in telescopic relationship with said upper end of said second bar,
    b) a second electric cylinder;
    c) said electric cylinder and said first outer sleeve are associated with said cross bar and said electric cylinder is further associated with said upper end of said first bar; and
    d) said second electric cylinder and said second outer sleeve are associated with said cross bar and said second electric cylinder is further associated with said upper end of said second bar.

6. A drainage tile flow regulator as claimed in claim 2 wherein said partition comprises an upper portion having an aperture, a lower portion having an aperture, a plurality of spacers for adjusting space between said apertures, and means for securing said partition in position comprises tracks mounted in said housing into which said upper portion, said lower portion, and said plurality of spacers slide.

7. A drainage tile flow regulator as claimed in claim 5 wherein said partition comprises an upper portion having an aperture, a lower portion having an aperture, a plurality of spacers for adjusting space between said apertures, and means for securing said partition in position comprises tracks mounted in said housing into which said upper portion, said lower portion, and said plurality of spacers slide.

8. The drainage tile flow regulator as claimed in claim 1 wherein said means for pre-selecting dates comprises an electronic calendar, at least one transceiver, and a software program wherein said dates are conveyed to said timer means such that said electric cylinder is actuated on said pre-selected dates.

9. The drainage tile flow regulator as claimed in claim 5 wherein said means for pre-selecting dates associated with said power source comprises an electronic calendar, at least one transceiver, means for wireless relay of a signal, and a software program wherein said dates are conveyed to said electronic calendar from said software by said means for wireless relay of said signal such that said first electric cylinder and said second electric cylinder are actuated on pre-selected dates.

10. The drainage tile flow regulator as claimed in claim 9 wherein said means for wireless relay of a signal to said transceiver from said software comprises a tower.

11. The drainage tile flow regulator as claimed in claim 9 wherein said power source comprise a solar panel for gathering solar power associated with a battery for storing said power.

12. A drainage tile flow regulator as claimed in claim 2 wherein said two opposed and aligned openings in said housing are placed near said bottom of said housing.

13. A drainage tile flow regulator as claimed in claim 2 wherein said flow adjustment assembly further comprises three flow positions wherein a first position is fully closed if said first gate and said second gate close said at least one aperture and said second aperture forcing water to flow over said partition; a second position is partially open when said first gate is moved relative to said at least one aperture such that it is open and said second gate is in position to close said second aperture forcing water to flow through said at least one aperture; and a third position is fully open when said first gate and said second gate open said at least one aperture and said second aperture allowing water to flow through each.

14. A drainage tile line flow regulator as claimed in claim 2 wherein said means for securing said partition between said front portion and said back portion comprises tracks affixed to said housing into which said partition slidably fits.

15. A drainage tile line flow regulator comprising:
  (a) a housing having at least two opposed and aligned openings to allow water to enter and exit said housing;
  (b) a flow adjustment assembly;
  (c) said flow adjustment assembly comprising a first and a second electric cylinder, a power source, and an actuator bar assembly;
  (d) means for pre-selecting dates comprising timing means and associated with said power source for controlling the actuation of said first and said second electric cylinders;
  (e) a partition dividing said housing into a front portion and a back portion and having vertically spaced first and second apertures to permit water to flow from the housing said front portion to said back portion and means for securing said partition in position between said front portion and said back portion; and
  (f) said actuator bar assembly comprising a cross support, a first bar including an upper end and a lower end, a first vertically movable gate associated with said lower end of said first bar, a second bar including an upper end and a lower end, a second vertically movable gate associated with said lower end of said second bar, and means for slidably associating each said gate with said partition such that upon the actuation of said first electric cylinder, said first gate moves relative to said first aperture and upon actuation of said second electric cylinder, said second gate moves relative to said second aperture.

16. The drainage tile line flow regulator as claimed in claim 15 wherein said timing means comprises a 12-month electronic calendar and said means for pre-selecting dates further comprises a software program, a relay tower, and a transceiver wherein said dates are entered in said software and a signal carrying the dates is relayed by said tower to said transceiver and, in turn, to said electronic calendar for actuating said first and second electric cylinders.

17. The drainage tile line flow regulator as claimed in claim 15 wherein said power source comprises a solar panel for gathering solar power and a battery for storing said power.

18. The drainage tile line flow regulator as claimed in claim 15 wherein said means for securing said partition in position between said front portion and said back portion of said housing comprises a channel mounted in said housing into which said partition is fitted and means for slidably associating said first vertically movable gate and said second vertically movable gate with said partition comprising at least one set of tracks mounted on said partition and spaced so as to slidably accommodate said first and second gates.

19. A drainage tile line flow regulator comprising
  (a) a housing having a bottom, and two opposed and aligned openings to allow water to enter and exit said housing;
  (b) a flow adjustment assembly;
  (c) said flow adjustment assembly comprising at least one electric cylinder, a solar panel for gathering solar power and a solar battery for storing said power;
  (d) means for pre-selecting dates for controlling the actuation of said at lest one electric cylinder comprising a 12-month electronic calendar, a software program, a transceiver associated with said calendar, and means for relaying a signal from said software program to said transceiver to actuate said at least one said cylinder;
  (e) a partition dividing said housing into a front portion and a back portion and having a height and a first aperture and a second aperture vertically spaced from one another to permit water to flow from the housing front portion to said back portion and means for securing said partition in position between said front portion and said back portion; and
  (f) said flow adjustment assembly for controlling flow through said first and second apertures further comprising:
    1. a first vertically movable gate and a second vertically movable gate;
    2. means for slidably associating said first and second gates with said. partition;
    3. a first bar with an upper end and a lower end whereas said upper end is associated with said electric cylinder and is in telescopic relationship with a first outer sleeve, and said lower end of said first bar is associated with said first vertically movable gate such that upon actuation of said at least one cylinder, said upper end moves vertically within said first outer sleeve and said first gate is vertically displaced;
    4. a second bar with an upper end and a lower end whereas said upper end is associated with said at least one electric cylinder and is in telescopic relationship with a second outer sleeve, and said lower end of said second bar is associated with said second vertically movable gate such that upon actuation of said at least one cylinder, said upper end of said second bar moves vertically within said second outer sleeve and said second gate is vertically displaced;
    5. said means for slidably associating said first gate with said partition and said manes for slidably associating said second gate with said partition each comprise a set of tracks mounted on said partition; and (g) three flow positions wherein:
1. fully closed comprises said first aperture and said second aperture closed by said first gate and said second gate respectively such that flow is directed over said height of said partition;
2. partially open comprises said first aperture opened by said first gate and said second aperture closed by said second gate whereby flow is directed only through said first aperture; and
3. filly open comprises said first aperture opened by said first gate and said second aperture opened by said second gate whereby flow is directed through said first and said second apertures.

20. The tile flow regulator as claimed in claim 19 wherein said partition comprises an upper portion containing said first aperture, a lower portion containing said second aperture, and a plurality of spacers for adjusting the vertical spacing between said first and second apertures and the height of said partition, and means for securing said partition in position comprising tracks mounted in said housing into which said upper portion, said lower portion, and said plurality of spacers are slidably received.

\* \* \* \* \*